(12) United States Patent
Hussaini et al.

(10) Patent No.: US 7,063,321 B2
(45) Date of Patent: Jun. 20, 2006

(54) GEL GRIP CONTROLLER

(75) Inventors: Saied Hussaini, Miami, FL (US); Marc Iacovelli, Miami, FL (US)

(73) Assignee: Intec, Inc., Miami, FL (US)

( * ) Notice: Subject to any disclaimer, the term of this patent is extended or adjusted under 35 U.S.C. 154(b) by 169 days.

(21) Appl. No.: 10/864,801

(22) Filed: Jun. 10, 2004

(65) Prior Publication Data

US 2005/0275165 A1   Dec. 15, 2005

(51) Int. Cl.
*A63F 13/02* (2006.01)
(52) U.S. Cl. .................................. 273/148 B
(58) Field of Classification Search ............ 463/36–38, 463/46, 47; 273/148 B
See application file for complete search history.

(56) References Cited

U.S. PATENT DOCUMENTS

| 4,558,112 | A |   | 12/1985 | Talcott |
| 5,501,458 | A | * | 3/1996 | Mallory .................. 273/148 B |
| 5,741,877 | A |   | 4/1998 | Tiffany |
| 5,788,195 | A | * | 8/1998 | Rice ........................ 248/118.5 |
| 6,016,138 | A | * | 1/2000 | Harskamp et al. .......... 345/163 |
| 6,120,025 | A |   | 9/2000 | Hughes |
| 6,195,085 | B1 | * | 2/2001 | Becker et al. ............... 345/163 |
| 6,241,247 | B1 | * | 6/2001 | Sternberg et al. ........ 273/148 B |
| 6,390,423 | B1 | * | 5/2002 | Danzyger et al. ........... 248/118 |
| 6,847,352 | B1 | * | 1/2005 | Lantigua ..................... 345/163 |
| 6,923,443 | B1 | * | 8/2005 | Hughes, IV ............ 273/148 B |
| 2002/0010020 | A1 | * | 1/2002 | Johnson ........................ 463/37 |
| 2002/0180148 | A1 | * | 12/2002 | Koziel ..................... 273/148 B |
| 2005/0075172 | A1 | * | 4/2005 | Coleman ...................... 463/47 |
| 2005/0275165 | A1 | * | 12/2005 | Hussaini et al. ........ 273/148 B |
| 2006/0003840 | A1 | * | 1/2006 | Bailey .......................... 463/36 |

\* cited by examiner

*Primary Examiner*—Raleigh W. Chiu
(74) *Attorney, Agent, or Firm*—Berenato, White & Stavish LLC

(57) ABSTRACT

The present invention is directed to a controller having a gel-gripping surface for engagement with a user's hand. The controller includes a housing having a plurality of operation members logistically positioned for manipulation by a user's hand. A handle portion adapted to be grasped by the hand of a user includes a deformable gel-grip extending over a substantial portion of the handle. The gel grip includes a flexible external exposed surface containing a semi-liquid flowable material within a cavity portion of the gel-grip. Such an arrangement provides a multi-directional deforming gripping surface with a comfortable feel.

19 Claims, 4 Drawing Sheets

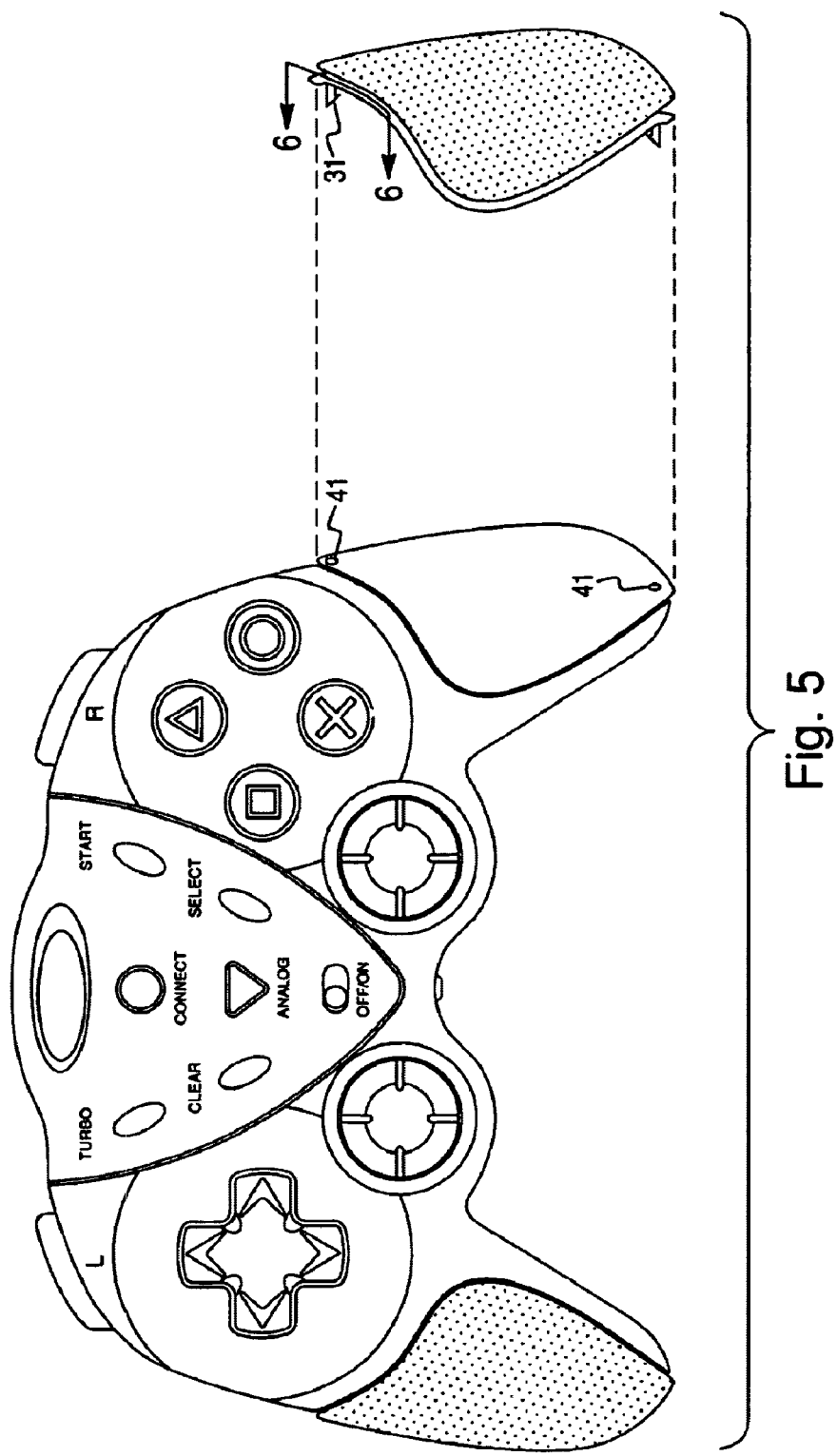

GEL GRIP CONTROLLER

BACKGROUND OF THE INVENTION

1. Field of the Invention

The present invention relates to a video game controller and more particularly to a controller with an integrated gel-grip.

2. Discussion of the Related Art

Video game controllers are also well in the art and conventionally employ a hard plastic housing to be grasped by the user. Such conventional controllers are uncomfortable and after significant use can cause blistering, perspiration and otherwise cause discomfort and poor performance for the user. U.S. Pat. No. 6,120,025 attempts to alleviate some of the problems associated with conventional controller grips by providing a simple covering material secured to the controller. (U.S. Pat. No. 6,120,025 is herein incorporated by reference.) Other attempts to provide cooling have been to incorporate a fan and force air through the controller. While the prior art grips may provide slight relief, they do not provide the level of comfort and feel as that of the present invention as heretofore described.

SUMMARY OF THE INVENTION

A primary object of the present invention is to provide a controller with a gel-gripping surface for engagement with a user's hand thus overcoming the shortcomings of the prior art devices. The controller includes a housing having a plurality of operation members logistically positioned for manipulation by a user's hand. A handle portion adapted to be grasped by a hand of a user includes a deformable gel-grip extending over a substantial portion of the handle. The gel grip includes a flexible external exposed surface containing a semi-liquid flowable material within a cavity portion of the gel-grip. Such an arrangement provides a multi-directional deforming gripping surface with a comfortable feel.

BRIEF DESCRIPTION OF DRAWINGS

FIG. 5 is a top view of a controller according to an alternate embodiment of the invention.

DESCRIOTION OF THE PREFERRED EMBODIMENTS

Figure 1:
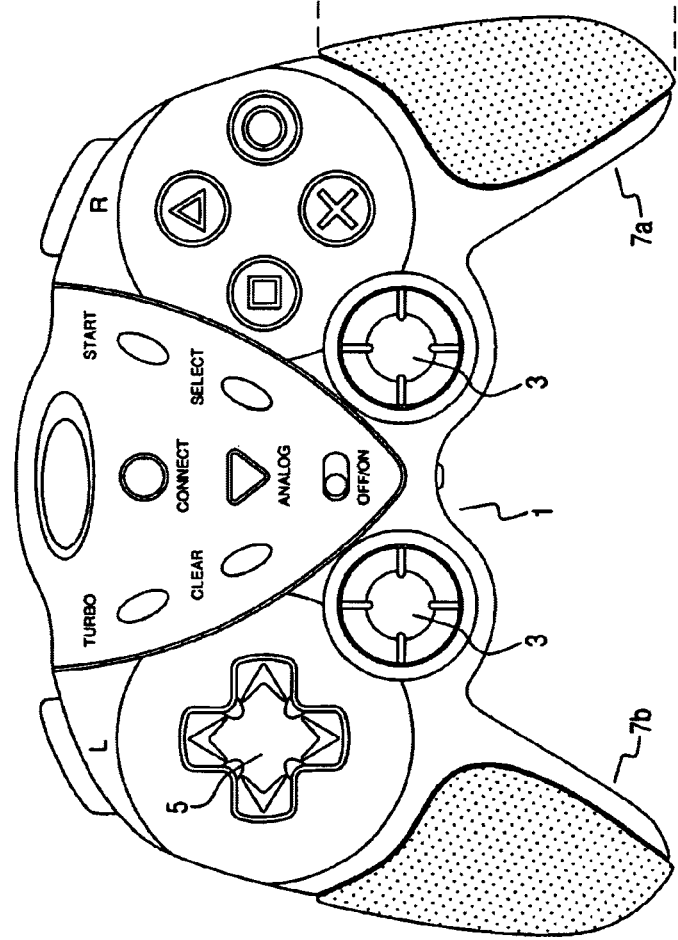
FIG. 1 is a top view of the controller with integrated gel grip according to the present invention.

FIG. 1 depicts a video controller having a plurality of operational members, such as a pair of stick controls 3, a D-pad 5, and a host of other conventional operational buttons. Each of the members providing operational control over respective characteristics of a given game. Two handle portions 7a, 7b extend from a central housing portion and are contoured to be grasped by a hand of a user. Conventionally, the controller is grasped simultaneously by two hands on each on a corresponding handle 7a, 7b. A deformable gel-grip 11 is secured to the each handle covering a substantial portion of the handle to provide conform and superior feel to the user. The details of the gel-grip will be explained in further detail below.

Figure 2:
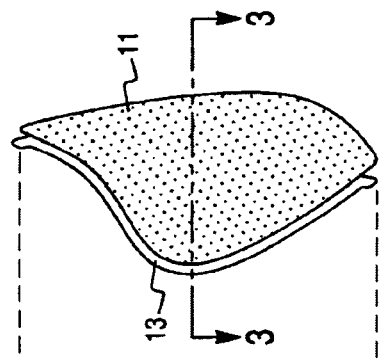
FIG. 2 is an isolated top view of the gel-grip.
Figure 3:
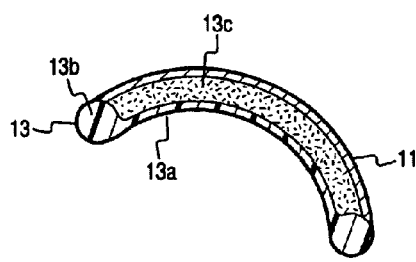
FIG. 3 is a cross sectional view of the gel-grip taken along line 3—3 of FIG. 2.

FIG. 2 depicts a gel-grip 11 according to one embodiment of the present invention. A retaining flanged 13 made of a substantially rigid material such as ABS plastic forms the outer boundary of the grip extending along the outer periphery and maintains the shape of the gel-grip. A flexible material 11 extending across a substantial portion of the external surface of the grip contains a semi-liquid flowable material within a closed cavity portion of the grip 11. Referring to FIG. 3, in one embodiment the retaining flange 13 has a back surface 13a substantially conforming to the external surface of the handle 7. A peripheral lip portion 13b lip extends along the outer periphery of the gel-grip defining its outer boundaries. The flexible material, such as fabric, is secured to the peripheral lip. The flowable semi-liquid material 13c is disposed between the back surface 13a and the flexible material 11. The retaining flange 13 is directly secured to the handle 11 with an adhesive or positive means as in an alternate embodiment which will be discussed later.

The gel material 13c may be contained directly between the flexible material 11 and back surface 13a of the flange. However, it is preferred to use a bladder filled with the gel 13c to ensure containment over the life of the grip and simplify the manufacture of the gel-grip. The gel 13c material may be a silicone based gel. For example, the gel material may be formed of a silicone psuedogel material as disclosed in U.S. Pat. No. 5,741,877, or that disclosed in U.S. Pat. No. 4,558,112, each of which is herein incorporated by reference. The material 13c needs to be flowable and semi-liquid while having sufficient viscous properties to provide sufficient feel of the controller while simultaneously providing superior comfort. The gel grip provides an exposed external gripping surface that s capable of simultaneously moving both orthoganally and translationally relative to handle during deformation when grasped by a users hand. The Gel grip of the present invention provides a superior balance between comfort and feel which here-to-for has not been recognized in the prior art controllers.

Figure 4:
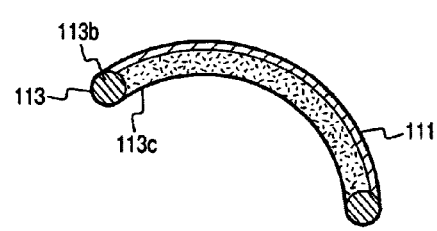
FIG. 4 is a cross sectional view of the gel-grip according to an alternate embodiment of the present invention.

FIG. 4 represents an alternate embodiment according to the present invention. In this embodiment, the retaining flange 113 is formed of a band member 113b extending along a substantial portion of the periphery of the gel grip. The gel filled bladder 113c and flexible material are simply adhered to the retaining flange 113. The retaining flange 113 and back surface of the gel filled bladder 113 are together adhered to an external surface of the handle 7a. The flexible material 111 may also extend over the back surface of the bladder (not shown) to define a closed cavity with the flange and the back surface of the flexible material and flange adhered to the handle 7a.

Figure 6:
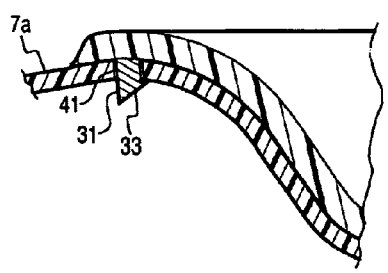
FIG. 6 is an isolated sectional view taken along line 6—6 of FIG. 5.

FIG. 5 represents an alternate embodiment of the present invention. Rather than adhering the gel grip to the handle, a connecting member engages a corresponding portion of the handle portion thereby providing a positive connection between the gel-grip and the handle 7. The connecting member includes a plurality of locking tabs 31 having a detent 33 formed proximate a terminal end. The locking tab 31 extends from an underneath portion of said gel-grip and engages the handle 7a through a recess 41 thereby providing said positive connection between the gel grip and handle 7a. FIG. 6 depicts a detailed view of the connection between the gel-grip and handle 7a.

Figure 8:
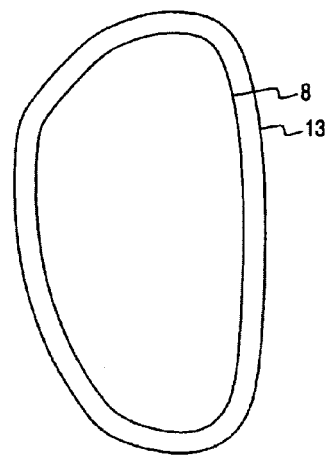
FIG. 8 is an exposed view of the connecting member depicting the closed lip and retaining flange according to an alternate embodiment.
Figure 7:
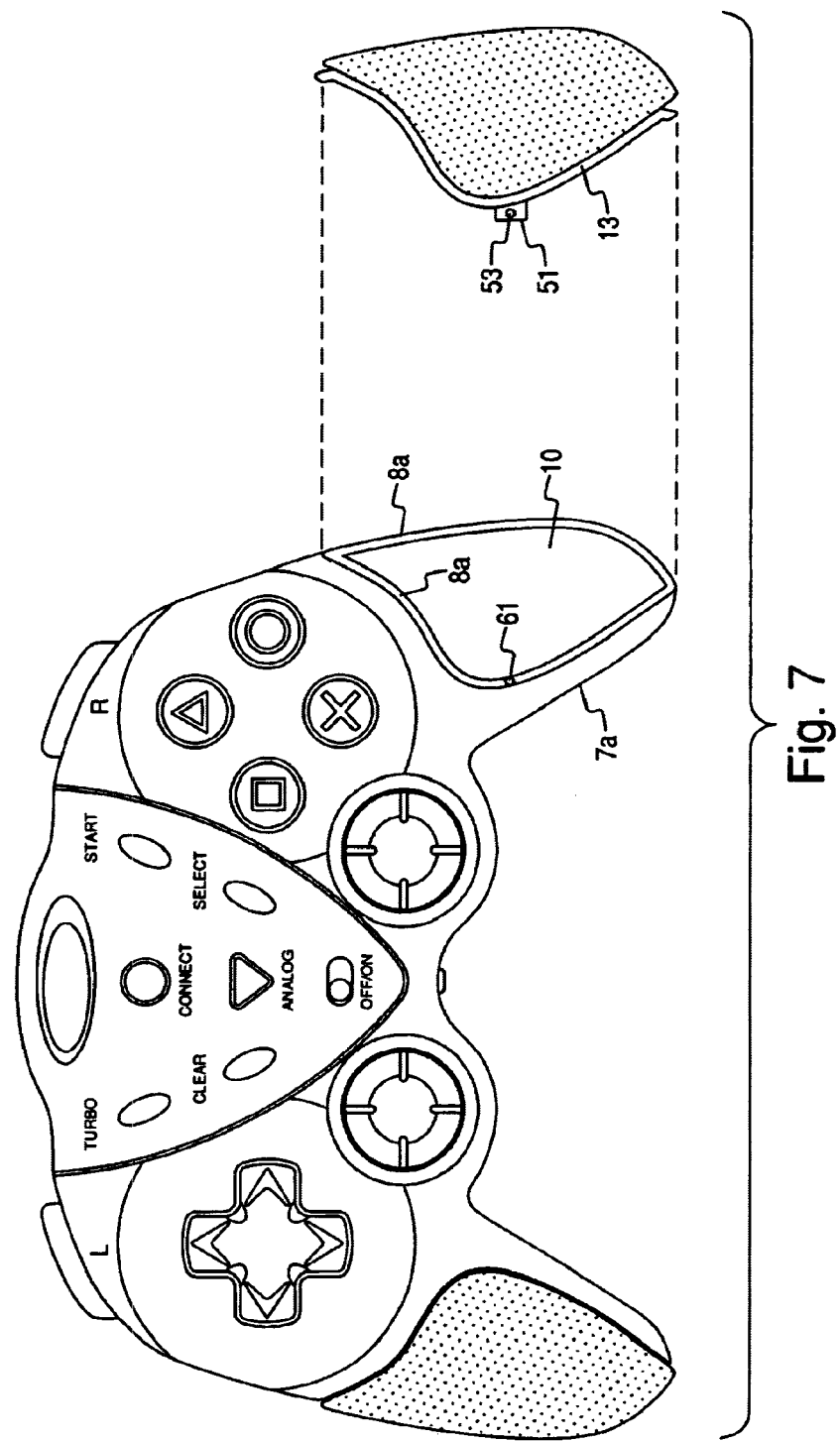
FIG. 7 is a top view of a controller according to an alternate embodiment of the invention.

FIGS. 7–8 depict alternate embodiments with connections between the gel-grip and handle 7a. In this embodiment the connecting member includes a closed lip 8 disposed on an underneath portion of the retaining flange 13 and engaging a corresponding groove 8 formed along an opening in the handle 7a thereby providing a snap-fit removable connection between said gel-grip and the handle 7a. The close lip 8 replaces the locking tab of the previous embodiment extending continuously around the underneath portion of the flange 13 as shown in FIG. 8. While the retaining flange is substantially rigid, such as formed of ABS plastic, it may be deformed slightly. To remove the gel-grip from the handle 7a, the retaining flange 13 need simply be pinched between thumb and forefinger to deform the flange 13 to unseat the lip from the groove. The flange 13 and lip 8 may simply be pushed into seating with the groove 8a in a snap-fit fashion. This arrangement provides for the ability to interchange gel-grips of differing color etc. and otherwise allow for replacement of the grip. A locking tab 51 having a bore 53 may also be provided to engage a peg 61 disposed within the handle 7a. To install the gel-grip, the flange 13 is simply pinched to deform the locking tab inward to clear the peg 61, when the flange 13 is released, the bore 53 slides over the peg 61 and the lip seats within the groove 8 and the gel grip secured to the handle 7a.

While the present invention has been shown and described with reference to specific embodiments forming the best mode, various changes in form and detail may be made without departing from the spirit and scope of the invention.

What is claimed is:

1. A video game controller comprising:
   a housing having a plurality of operation members logistically positioned for manipulation by a user said housing having a gripping area;
   at least one handle portion adapted to be grasped by a hand of a user; and
   an integrated deformable gel-grip extending over a substantial portion of said handle portion and being positively connected thereto through a substantially rigid structural retaining member, said gel grip including a flexible external exposed surface containing said semi-liquid flowable material within a closed cavity portion of said gel-grip thereby providing a multi-directional deformation of said flexible external exposed surface.

2. The controller according to claim 1, wherein said flexible external exposed surface is capable of simultaneously moving both orthoganally and translationally relative to said handle portion.

3. The controller according to claim 1, wherein said flexible external exposed surface of said gel-grip includes a fabric material.

4. A video game controller comprising:
   a housing having a plurality of operation members logistically positioned for manipulation by a user said hand held body having a gripping area;
   at least one handle portion adapted to be grasped by a hand of a user; and
   a deformable gel-grip extending over a substantial portion of said handle, said gel grip including a flexible external exposed surface containing said semi-liquid flowable material within a closed cavity portion of said gel-grip thereby providing a multi-directional deformation of said flexible external exposed surface; wherein said gel grip further includes a semi rigid retaining flange extending along at least a portion of a periphery of said gel-grip, said semi-rigid retaining flange being directly secured to said hand held body thereby securing said gel grip to said controller.

5. The controller according to claim 4, wherein said retaining flange is comprised of a band member extending along a substantial portion of said periphery of said gel grip, said flexible external exposed surface having an additional back surface and defining said closed cavity containing said semi-liquid flowable material member, said flexible material being secured to said band member of said retaining flange and being substantially bound therein.

6. The controller according to claim 5, wherein said retaining flange is adhered to an external surface of said handle portion.

7. The controller according to claim 5, wherein said back surface of said flexible external exposed surface is adhered to an external surface of said handle portion.

8. The controller according to claim 5, wherein said retaining flange includes a connecting member engaging a corresponding portion of said handle portion of said controller thereby providing a positive connection between said gel-grip and said handle portion.

9. The controller according to claim 8, wherein said connecting member includes at least one locking tab having a detent formed proximate a terminal end thereof, said locking tab extending from an underneath portion of said gel-grip and engaging a recess formed in said handle portion thereby providing said positive connection.

10. The controller according to claim 8, wherein said connecting member includes a closed lip disposed on an underneath portion of said retaining flange and engaging a corresponding annular recessed formed along an opening in said handle thereby providing a snap-fit removable connection between said gel-grip and said handle portion.

11. The controller according to claim 5, wherein said retaining flange is formed of ABS plastic.

12. The controller according to claim 4, wherein said retaining flange includes a back surface substantially conforming to an external surface of said substantial portion of said handle portion and a peripheral lip, said flexible material being secured to said peripheral lip and said flowable material being disposed between said back surface and said flexible material, said retaining flange being.

13. The controller according to claim 12, wherein said retaining flange is adhered to an external surface of said handle portion.

14. The controller according to claim 12, wherein said retaining flange includes a connecting member engaging a corresponding portion of said handle portion of said controller thereby providing a positive connection between said gel-grip and said handle portion.

15. The controller according to claim 14, wherein said connecting member includes at least one locking tab having a detent formed proximate a terminal end thereof, said locking tab extending from an underneath portion of said gel-grip and engaging a recess formed in said handle portion thereby providing said positive connection.

16. The controller according to claim 14, wherein said connecting member includes a closed lip disposed on an underneath portion of said retaining flange and engaging a corresponding groove formed along an opening in said handle thereby providing a snap-fit removable connection between said gel-grip and said handle portion.

17. The controller according to claim 12, wherein said retaining flange is formed of ABS plastic.

18. The controller according to claim 4, wherein said retaining flange is formed of ABS plastic.

19. According to claim 4, wherein said retaining flange includes a peripheral surface engaging a corresponding peripheral surface of an opening formed in said handle portion, said retaining flange further including a locking at least partially projecting into said handle portion and engaging a locking member therein to form a releasable connection between said gel-grip and said handle portion.

* * * * *